United States Patent Office 3,501,395
Patented Mar. 17, 1970

3,501,395
MANGANESE CARBONATE-CONTAINING MINERALS AND THEIR USE IN HYDROCARBON CONVERSIONS
Joseph N. Miale, Trenton, N.J., assignor to Mobil Oil Corporation, a corporation of New York
No Drawing. Filed Nov. 28, 1966, Ser. No. 597,244
Int. Cl. C10g 13/04; B01j 11/32
U.S. Cl. 208—112            18 Claims

ABSTRACT OF THE DISCLOSURE

A catalyst for hydrocarbon conversion comprising a base exchanged calcined manganese carbonate-containing mineral having hydrogen ions bonded thereto.

---

This invention relates to hydrocarbon conversion catalysts, to the preparation thereof, and to a process of converting hydrocarbons by subjecting the same to contact with said catalysts under conversion conditions.

More particularly, the invention relates to the use of a manganese carbonate-containing natural mineral as catalyst in hydrocarbon conversion processes, particularly after enhancement of the catalytic activity of the mineral by base-exchange treatment. Thus, it has been found that a mineral like rhodochrosite, is not only considerably useful in the "as-received" state as a catalyst in hydrocarbon conversions such as cracking, but, after base exchange and calcination to form a composite containing hydrogen ions, the utility of the mineral as a cracking catalyst is considerably enhanced. In terms of alpha activity, described below, rhodochrosite in the natural state has a cracking activity denoted by an alpha value of 3.4, which means that it is 3.4 times more active than conventional amorphous silica-alumina, itself a good cracking catalyst. After conversion of the mineral to what may be called the hydrogen form, it exhibits an increased alpha value of 17. It is to be noted that natural rhodochrosite contains a substantial number of alkali metal and/or alkaline earth metal cations which are exchangeable.

The natural minerals contemplated by the invention include rhodochrosite, capillitite, kutnahorite, manganocalcite, manganosiderite, oligonite, ponite, and tephroite. Rhodochrosite, the preferred mineral, is naturally occurring manganese carbonate, $MnCO_3$. It is a rose-colored material of vitreous luster, having a hardness of 3.5–4 and a specific gravity of 3.45–6. Generally, the MnO content may vary, depending on the source of the mineral, from about 29.8 to 61.7% by weight; the carbonate content (as $CO_2$) from about 36.6 to 41.6%; the CaO from about 0.09 to 19.40%; the FeO from 0.06 to 26.8%; the MgO from a trace to 12.98%. Also present are some ZnO, CdO, and PbO. Capillitite is a homogeneous manganese carbonate-containing mineral which also has some iron, calcium, and zinc. It has a yellowish color. Kutnahorite is Ca(Mn— —,Mg)(CO$_3$)$_2$, with Mn being greater than Mg; it has a color of white to pale rose and a gravity of 3.0. Manganocalcite is a manganese calcium carbonate of pinkish color. Manganosiderite is a fawn or brownish manganese iron carbonate. Oligonite is another manganese iron carbonate, being a "taffy" colored material containing about 35.3% MnO, 37.98% $CO_2$, and 26.18% FeO. Ponite is a brownish manganese calcium iron carbonate.

As indicated, and as shown below, natural rhodochrosite exhibits a catalytic action in the conversion of hydrocarbons, but when converted to the hydrogen form, in which at least a portion of its alkali metal and/or alkaline earth metal cations are replaced by hydrogen ions, its catalytic action is considerably increased, as is true of the other described minerals. To effect such conversion, the natural mineral is treated with a fluid medium containing positive ions comprising hydrogen ion precursors to give, ultimately, a composite having hydrogen ions. (As may be apparent, "composite" is the term applied to the mineral after a portion at least of its alkali and alkaline earth metal cations has been replaced by hydrogen ions). The steps involved are base exchange and calcination, and the hydrogen ions are bonded to the mineral, thereby forming the composite. The latter is strongly acidic as a result. To illustrate the treatment, the mineral may be arranged in the form of a fixed bed, and the fluid medium in the form of an aqueous solution is passed slowly through the bed at ambient temperature and pressure for a time sufficient to substantially exhaust the alkali or alkaline earth metal cations of the mineral. The aqueous solution has a pH above that at which the mineral decomposes, preferably above 4. When the treatment is finished, the resulting composite is washed with distilled water until the effluent wash water has a pH between 5 and 8.

Considering the treatment in additional detail, the fluid medium may be aqueous or non-aqueous, preferably the former. Polar solvents are useful, and may include organic solvents which permit ionization of hydrogen-containing substances added thereto, such as cyclic and acyclic ethers like dioxane, tetrahydrofuran, diethyl ether, etc.; ketones like acetone and methylethyl ketone esters like ethyl acetate and propyl acetate; alcohols like ethanol, propanol, butanol, etc.; and miscellaneous solvents like dimethylformamide. Other fluid media are carboxy polyesters.

A preferred base-exchange procedure comprises treating the mineral with an aqueous solution of a compound which supplies hydrogen ion precursor, such as ammonium ion, washing the material as described, drying it at 100–300° F., and then heating it to a temperature below its decomposition temperature to convert the substituent ammonium ions to hydrogen ions. The ammonium ions may be supplied by such compounds as ammonium chloride, ammonium bromide, ammonium iodide, ammonium carbonate, and the like, including those recited in U.S. Patents Nos. 3,140,252 and 3,140,253. The concentration of ammonium compound in the base-exchange solution is usually up to 5% by weight but may be higher. It may also be noted that mono-, di-, and trialkylammonium, as well as mono-, di-, and triarylammonium salts are capable of supplying substituted ammonium ions which, on calcination, are converted to hydrogen ions; thus, these salts are also of value for the base exchange.

Temperatures in the base exchange may range up to temperatures just below that at which the mineral decomposes. Pressures may vary from subatmospheric to superatmospheric. Drying of the base-exchanged mineral may be done over a period of 10 to 20 hours, after which it is calcined in air at 800 to 1400° F., preferably 1000° F., for up to 20 or more hours. Calcining converts the ammonium or substituted ammonium ion to hydrogen ion. The resulting composite may have bonded thereto at least 0.01 gram, preferably 0.01 to 0.5 gram, of hydrogen ions per 100 grams of composite.

If desired, the mineral, either before, during, or after base exchange, may be mixed in any desired way with a matrix, generally comprising a porous inorganic oxide which can serve as a binder and, if suitably chosen, as an auxiliary catalyst. A number of appropriate matrices are set forth in U.S. 3,210,267 and include silica-alumina gel, silica gel, alumina gel, as well as gels of alumina-boria, silica-zirconia, silica-magnesia, and the like. Natural clays are useful, such as kaolin, attapulgite, kaolinite, bentonite, montmorillonite, etc., and if desired, the clays may be calcined or chemically treated as with an acid or an alkali. The invention also contemplates mixing one or more base-exchanged minerals such as rhodochrosite, or any of those described, with a crystalline aluminosilicate, such as Zeolite A, Zeolite X, or Zeolite Y, or any of the other described aluminosilicates in U.S. Patent Nos. 3,140,252 and 3,140,253.

Turning now to a consideration of hydrocracking conversions, these include cracking, hydrocracking, oxidation, olefin hydrogenation, and olefin isomerizaiton.

Cracking of suitable hydrocarbon stocks is generally carried out at a temperature of 800–1100° F., a pressure ranging from subatmospheric to several hundred atmospheres, and a liquid hourly space velocity, LHSV, of 1 to 10, to produce valuable products including gasoline. The charge stock may be any material heretofore used in conventional cracking employing conventional silica-alumina catalyst. The process may be carried out in any equipment suitable for catalytic operations, and may be operated batchwise or continuously, and with a fixed bed of catalyst or moving bed wherein the hydrocarbon flow may be concurrent or countercurrent to the catalyst flow. A fluid type of operation may also be employed. The resulting products are suitably separated by conventional means. Also, the catalyst after use over an extended period of time may be regenerated in accordance with well understood procedures by burning off carbonaceous deposit from its surfaces in an oxygen-containing atmosphere under conditions of elevated temperature.

Hydrocracking is generally carried out at a temperature between 400 and 950° F. For such process, the aforenoted manganese-carbonate containing minerals may suitably be combined with one or more dehydrogenation components, exemplary of which are the metals, oxides and sulfides of metals of Group VI and VIII of the Periodic Table. The hydrogen pressure in such operation is usually within the range of 100 and 3000 p.s.i.g., and, preferably, 350 to 2000 p.s.i.g. The LHSV is between 0.1 and 10. In general, the molar ratio of hydrogen to hydrocarbon charge is between 2 and 80, preferably between 5 and 50. Suitable charge stocks comprise petroleum fractions having an initial boiling point of at least about 400° F., a 50% point of at least about 500° F., and end point of at least about 600° F. Such hydrocarbon fractions include gas oils, residual oils, cycle stocks, whole topped crudes, and heavy fractions derived by the destructive hydrogenation of coal, tars, pitches, asphalts, and the like.

Hydrocarbon oxidation may be performed at temperatures of 250 to 1500° F. in the presence of oxygen or air. Mole ratio of charge to oxygen is 1:0.1 to 1:200. This reaction is of value in a number of applications, as in automobile exhaust gas catalytic converters where unburned products in the gas are oxidized to carbon dioxide and water.

In olefin hydrogenations the reaction temperature may range up to 1000° F., the pressure from 10 to 3000 p.s.i., and the LHSV from 0.1 to 10. The operation is useful to form corresponding saturated hydrocarbons, to remove gum formers from gasoline, to pretreat stocks for cracking, hydrocracking, and the like.

Olefin isomerization, comprising the shift of a double bond in an olefin, is suitably performed at 300 to 900° F., a pressure of 1 to 10 atmospheres, and an LHSV of 0.1 to 10. The process is of value in the manufacture of olefin addition products such as alcohols and alkyl halides.

The invention may be illustrated by the following examples:

EXAMPLE 1

A sample of rhodochrosite from Butte, Montana was ground to about 5 microns particle size, pelleted, and then crushed to 12–25 mesh size. A 1-ml. aliquot was tested for n-hexane cracking activity at 1000° F., using the conventional alpha test. In this test, which is a micro test, the activity of the catalyst is reported in terms of alpha activity, by which is meant the conversion capability, as determined in the micro test, of the rhodochrosite by comparison with that of a conventional amorphous silica-alumina cracking catalyst (90% $SiO_2$— 10% $AlO_2$) in the cracking of n-hexane. The particular silica-alumina catalyst referred to is one having an activity index, or A.I., of 46 as measured by the well known "Cat. A" test, which is described in National Petroleum News 36 R–537 (Aug. 2, 1944), and in patents such as U.S. 2,485,626 and 2,697,066. In the micro test, which is described in Journal of Catalysis 4, No. 4, 527–529 (1965), the activity of the rhodochrosite is designated alpha, and represents the comparative activity of such catalyst relatively to an activity of 1 for the conventional silica-alumina catalyst. The result appears below in Table I.

EXAMPLE 2

The catalyst material resulting from the hexane cracking test of Example 1 was subjected to regeneration by heating at 1000° F. for ½ hour in the presence of air flowing thereover at a rate of 20 cc./min. The regenerated catalyst was then tested in the described hexane cracking test, at a temperature of 900° F., with the result noted in Table I.

EXAMPLE 3

A 2-gram aliquot of rhodochrosite from Example 1 was base exchanged for 20 hours with 250 ml. of an aqueous solution of 1 normal ammonium chloride at room temperature. The filtrate of the base exchange solution of ammonium chloride, recovered after contact with the mineral, had a pH of 7.2, as against its original pH of 4.9, thus indicating it had become more alkaline. In other words, the solution was able to replace a considerable amount of alkali metal cations originally present in the rhodochrosite. The resulting product was washed with water, dried for one hour at 105° C., calcined for three hours in dry air at 1000° F., and then tested for hexane cracking at 1000° F. The result is shown in Table I, which follows.

TABLE I

| Catalyst | Alpha Value |
|---|---|
| Example: | |
| 1 ............ Rhodochrosite, as received ...................... | 3.4 |
| 2 ............ Rhodochrosite of Example 1, regenerated ......... | 2.4 |
| 3 ............ Rhodochrosite, base exchanged and calcined ..... | 17 |

It may be seen that natural rhodochrosite is 3.4 times more active than conventional amorphous silica-alumina, the latter itself being considered to be a good cracking catalyst. The activity increases more than 4 times upon base exchange and calcination.

EXAMPLE 4

An equivolume mixture of rhodochrosite and a synthetic crystalline aluminosilicate identified as NaX was prepared. It was calcined at 1000° F. for 15 minutes, after which a 1-ml. aliquot was taken and tested for n-hexane cracking activity. The alpha value was 6.1.

As will be apparent, the base-exchanged minerals described above as "composites" also comprise "catalysts."

It will be understood that the invention is capable of obvious variations without departing from its scope.

In the light of the foregoing description, the following is claimed.

What is claimed is:

1. A catalyst comprising a base-exchanged, calcined manganese carbonate-containing natural mineral having hydrogen ions bonded thereto in an amount of at least 0.01 gram per 100 grams of said mineral.

2. Catalyst of claim 1 wherein said hydrogen ions are present in an amount of 0.01 to 0.5 gram per 100 grams of said mineral.

3. Catalyst of claim 1 having a n-hexane cracking activity greater than that of a conventional amorphous silica-alumina catalyst, said cracking activity being regenerable after inactivation of the catalyst by inactivating deposits.

4. Catalyst of claim 1 wherein said base-exchanged calcined mineral is rhodochrosite.

5. Catalyst of claim 1 wherein said base-exchanged calcined mineral is kutnahorite.

6. Catalyst of claim 1 wherein said base-exchanged calcined mineral is capillitite.

7. Catalyst of claim 1 wherein said base-exchanged calcined mineral is manganosiderite.

8. Catalyst of claim 1 wherein said base-exchanged calcined mineral is manganocalcite.

9. A catalyst for hydrocarbon conversions comprising base-exchanged calcined rhodochrosite, said rhodochrosite prior to base exchange containing alkali metal and/or alkaline earth metal cations which in said base-exchanged calcined rhodochrosite are replaced by hydrogen ions in an amount of 0.01 to 0.5 gram per 100 grams of said rhodochrosite, said catalyst having a n-hexane cracking activity greater than that of a conventional amorphous silica-alumina catalyst, and said cracking being regenerable after inactivation of the catalyst by inactivating deposits.

10. A method for making a catalyst useful in hydrocarbon conversions which comprises base-exchanging a manganese carbonate-containing alkali metal and/or alkaline earth metal cation-containing natural mineral by treating the same with a fluid medium containing exchangeable hydrogen ion precursors, calcining the resulting material, and thereby producing a base-exchanged calcined manganese carbonate-containing product having ions bonded thereto in an amount of 0.01 to 0.5 gram per 100 grams of said product.

11. Method of claim 10 wherein said mineral is rhodochrosite containing exchangeable alkali metal and/or alkaline earth metal cations in an amount, expressed as calcium oxide, of about 0.05 to 1.2% by weight thereof, and wherein said base exchange is effected so that the resulting rhodochrosite material has hydrogen ion precursors bonded thereto, and wherein said calcining step produces hydrogen ions bonded to the rhodochrosite mineral in an amount of at least 0.01 gram per 100 grams of said rhodochrosite mineral.

12. Method of claim 11 wherein said base exchange comprises treating the rhodochrosite with a solution of a salt capable of supplying hydrogen ion precursors selected from ammonium, alkylammonium and arylammonium ions, thereby to replace at least a portion of said alkali metal and/or alkaline earth metal cations by said precursors, and wherein the resulting material is calcined to convert the precursor ions to hydrogen ions.

13. Method of converting a hydrocarbon which comprises contacting the same under conversion conditions with the catalyst of claim 1.

14. Method of claim 13 wherein said converting step is a cracking step carried out under cracking conditions.

15. Method of claim 13 wherein said converting step comprises hydrogenating an olefin in the presence of hydrogen and under hydrogenating conditions.

16. Method of claim 15 wherein said converting step comprises isomerizing an olefin under isomerization conditions.

17. Method of claim 15 wherein said converting step comprises oxidizing a hydrocarbon in the presence of oxygen and under oxidizing conditions.

18. Method of claim 15 wherein said converting step is a hydrocracking step carried out in the presence of hydrogen and under hydrocracking conditions.

References Cited

UNITED STATES PATENTS

| | | | |
|---|---|---|---|
| 1,345,323 | 6/1920 | Frazer et al. | 252—471 |
| 2,265,389 | 12/1941 | Melaven et al. | 208—119 |
| 2,271,318 | 1/1942 | Thomas et al. | 208—120 |
| 3,264,208 | 8/1966 | Plank et al. | 208—120 |

DANIEL E. WYMAN, Primary Examiner

C. F. DEES, Assistant Examiner

U.S. Cl. X.R.

208—121; 252—471; 260—683, 683.2, 683.3

PO-1050
(5/69)

UNITED STATES PATENT OFFICE
CERTIFICATE OF CORRECTION

Patent No. 3,501,395      Dated March 17, 1970

Inventor(s) Joseph N. Miale

It is certified that error appears in the above-identified patent and that said Letters Patent are hereby corrected as shown below:

Column 1, line 31,    "mineral" should read --material--.
Column 3, line 4,    "hydrocracking" should read --hydrocarbon--.

SIGNED AND
SEALED
SEP 1 - 1970

(SEAL)
Attest:

Edward M. Fletcher, Jr.
Attesting Officer

WILLIAM E. SCHUYLER, JR.
Commissioner of Patents